United States Patent [19]
Shimizu et al.

[11] 4,165,665
[45] Aug. 28, 1979

[54] WEB CUTTING APPARATUS

[75] Inventors: Shigehisa Shimizu; Shigemitsu Mizutano, both of Minami-ashigara, Japan

[73] Assignee: Fuji Photo Film Co., Ltd., Minami-ashigara, Japan

[21] Appl. No.: 861,339

[22] Filed: Dec. 16, 1977

[30] Foreign Application Priority Data

Dec. 23, 1976 [JP] Japan .................................. 51-155541

[51] Int. Cl.² .......................... B26D 1/56; B23D 25/04
[52] U.S. Cl. .......................................... 83/287; 83/320; 83/318
[58] Field of Search ................. 83/287, 317, 318, 320, 83/74, 295, 298, 328

[56] References Cited

U.S. PATENT DOCUMENTS

| | | | |
|---|---|---|---|
| 3,178,974 | 4/1965 | Roess | 83/318 |
| 3,292,473 | 12/1966 | Couzens et al. | 83/318 |
| 3,881,382 | 5/1975 | Rasenberger et al. | 83/320 |
| 3,911,773 | 10/1975 | Inowaki | 83/320 |
| 3,982,454 | 9/1976 | Schneider et al. | 83/287 |

*Primary Examiner*—Donald R. Schran
*Attorney, Agent, or Firm*—Sughrue, Rothwell, Mion, Zinn and Macpeak

[57] ABSTRACT

In a web cutting apparatus comprising a first cutting blade and a second cutting blade in face-to-face relationship above and below the two surfaces of a continuously moving web, the parallel travelling speed of the first and second cutting blades are made identical with the travelling speed of the web at the time when the web is cut by the joint action of the first and second cutting blades.

5 Claims, 6 Drawing Figures

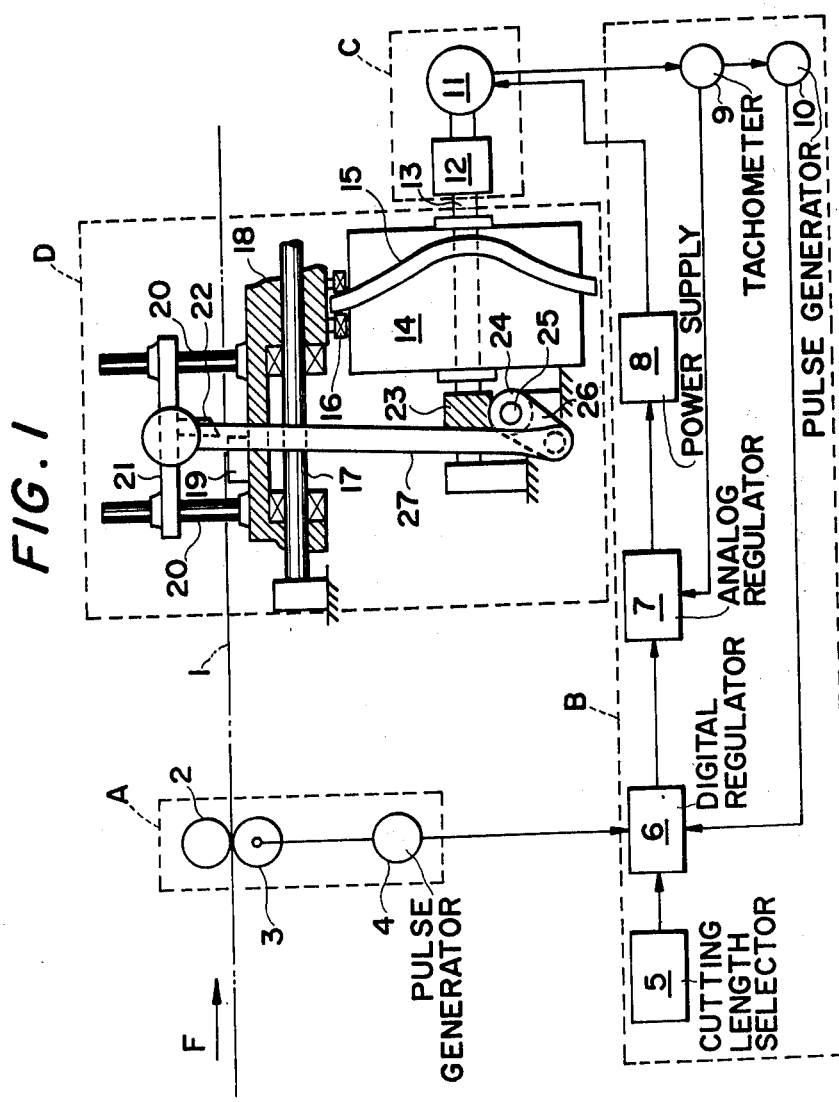

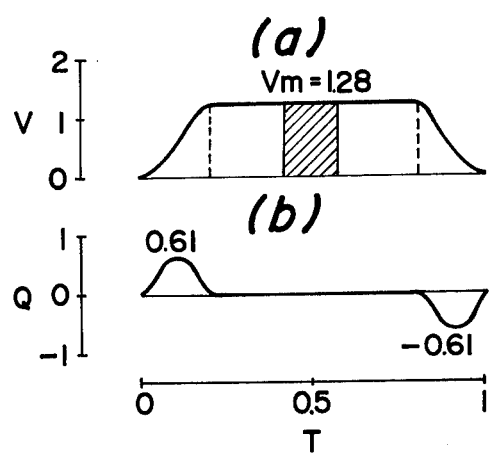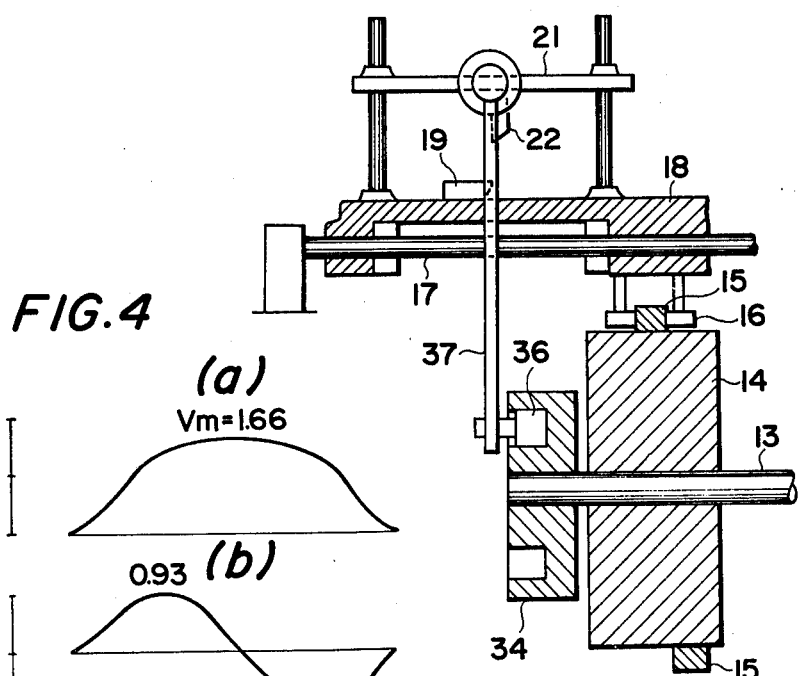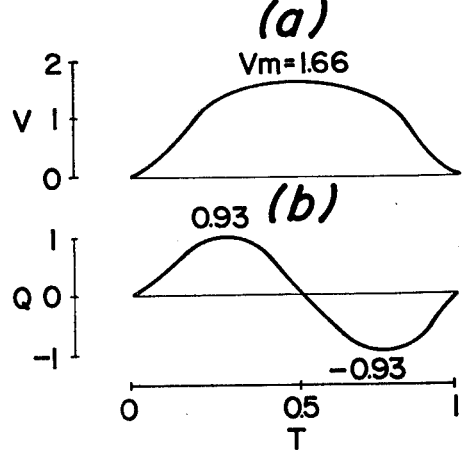

WEB CUTTING APPARATUS

BACKGROUND OF THE INVENTION

1. Field of the Invention

The present invention is directed to a web cutting apparatus, and more particularly to an apparatus in which a continuously travelling web is cut into a desired length.

2. Description of the Prior Art

The term "web" referred to in the present invention is a relatively long and flexible belt like substance generally having a thickness of 5 microns to 5 mm and a width of 10 cm to 3 m and comprises, for example, a plastic film of polyvinyl chloride, polycarbonate, acrylonitrile-styrene copolymers, ABS resins, polyesters, polyester resins containing glass fibers, cellulose derivatives or the like, and further, a sheet of paper, synthetic paper or the like, or a thin metal plate such as aluminum, copper or the like.

In general, the above mentioned web is, after once winding up into a roll shape during its manufacturing process, cut into a desired length depending upon its use while rewinding it during a machining step. In order to effectively carry out the cutting, two types of cutting apparatuses have been widely employed. One is a rotary cutter comprising a pair of rotary blades which are placed face-to-face one above and one below the web. The rotary blades are driven with the same circumferential speed as the longitudinal speed of the web and cuts the web into a desired length by engaging respective edges of the rotary blades. The other is called a self running cutter and comprises a freely vertically movable blade above the web and a receiving blade below the web which cuts the web by moving the movable blade downward to the receiving blade while simultaneously moving the movable blade and recieving blade parallel to the web. Because both make it their main purpose to cut the web into a desired length without stopping the running of the web, it has been expected that cutting in accordance with either apparatus would be extremely difficult.

However, in the former, it takes considerable time to determine the engagement of respective edges of the rotary blades for cutting of the web and for adjustment thereof since the rotary blades are held with supporting means which are respectively independent and freely rotatable. In addition, since it is necessary that the circumferential speeds of respective blade edges be identical with the longitudinal speed of the web, mechanical errors found in the freely rotatable supporting means as well as respective driving systems of the web, e.g., slip, backlash, etc., have been obstacles to raising accuracy in cutting length of the web. On the other hand, while the latter greatly improves the disadvantages in determining engagement of respective blade edges and in making speeds uniform and controlling them in respective driving systems with resulting greatly improved accuracies in cutting lengths of the web, it is still not sufficiently accurate for applications requiring much higher accuracy in cutting length, e.g., requiring accuracies on the order of 500 microns or less.

After investigations and analyses with respect to the major causes thereof, the present inventors have confirmed that torque variations having a relatively large level difference are generated whenever the driving system in which the movable blade and receiving blade are simultaneously moved in the direction parallel to the web and the driving system in which the movable blade is moved downward to the receiving blade is operated with a more or less time lag. As a result, uneven rotation is caused in the driving sources mentioned above so that a warp tends to occur at the engagement point between the movable blade and receiving blade, that is, at the cutting point of the web, and this tendency is increased if the running speed of the web increases. In addition, it is generally the case that a common driving source is used to drive the cutting mechanism and the web in order to minimize production costs. Therefore, it was difficult to change the cutting length of the web once it was set, and thus the apparatus was unsuitable for cutting a web in a wide variety of cutting sizes.

SUMMARY OF THE INVENTION

The present invention has for its object the elimination of the disadvantages of the conventional apparatus described above and providing a web cutting apparatus capable of efficiently cutting the web in a desired length with good accuracy while moving the web at a high speed, which apparatus is easily maintained and inspected due to a relatively simple structure thereof.

The foregoing and other objects of the present invention are achieved by providing a web cutting apparatus comprising a first cutting blade and a second cutting blade in face-to-face relation to one another above and below the two surfaces of a continuouly travelling web. Either one of first and second cutting blades is made to move perpendicular to the moving web so as to cut the web in a width direction thereof. More specifically, the web cutting apparatus further comprises a rotary main drive shaft which rotates in one direction at a constant speed, a cam mechanism comprising a modified isokinetic cam surface which causes the first and second cutting blades to simultaneously move in the length direction of the web parallel to the web by the rotation of the rotary main drive shaft, and a crank or cam mechanism which causes either one of the first and second cutting blades to move in a perpendicular direction so as to cut the web in a width direction thereof by perpendicularly crossing with the web by the rotation of the rotary main drive shaft. The parallel travelling speeds of the first and second cutting blades are identical with the travelling speed of the web, and the web is cut by the first and second cutting blades around the center of a stroke of the parallel back and forth motion.

BRIEF DESCRIPTION OF THE DRAWINGS

Embodiments of the apparatus in accordance with the present invention will be explained in more detail with reference to the drawings attached hereto, wherein:

FIG. 1 is a block diagram showing the structure of one embodiment of the apparatus in accordance with the present invention;

FIGS. 2a, 2b and 4a, 4b represent curves for the cam used in apparatuses in accordance with the present invention, respectively; and FIG. 3 represents a modification of the driving means for the upper blade die of the apparatus in accordance with the present invention.

DETAILED DESCRIPTION OF THE INVENTION

The web cutting apparatus in accordance with the present invention is illustrated in FIG. 1 as comprising a web length-detecting portion A, a control portion B, a driving source C and a cutting portion D. A travelling length of web 1 is determined with the aforementioned web length-detecting portion A comprising a pair of nip rollers 2 and 3 and a pulse generator 4 driven by the nip roller 3 as web 1 is continuously moved to the cutting portion D by a separate driving source (not shown in the drawing) at a predetermined speed. Thus, pulse signals representing web length are supplied to the control portion B.

The control portion B comprises a cutting length selector 5, a digital regulator 6, an analog regulator 7, a controlled power supply 8, a tachometer 9 driven by a motor 11 in the driving source C and a pulse generator 10. The digital regulator 6 receives as one input the output signal of the pulse generator 4, as another input the instructions for length from the cutting length selector 5, and as a further input a signal indicating the position of the cutting blades from the pulse generator 10. The digital regulator 6 produces output velocity signals for the cutting blades which are supplied to the analog regulator 7. The analog regulator 7 also receives as an input signals representing the velocity of the cutting blades from the tachometer 9 and produces a driving output signal to the driving source C via the power supply 8. Thus, the control portion B is a velocity and position servo system of more or less conventional design using conventional components. For example, the cutting length selector 5 may be a digital register which is loaded by means of key switches or the like. Digital regulator 6 may include respective counters for counting the pulses from pulse generators 4 and 10, a digital comparator and a digital-to-analog converter. The counts accumulated in the counters are repesentative of the length of web fed to the cutting portion D and the position of the cutting blades. The information stored in the cutting length selector register is compared with the counts accumulated in the counters to produce a digital velocity command signal which is converted to an analog velocity command signal. The analog regulator 7 may be a simple summing circuit which receives the velocity command signal from the digital regulator 6 and the velocity signal from the tachometer 9 to produce a difference error signal to control the output of power supply 8.

The driving source C comprises a motor 11 and a reduction device 12 and drives the cutting portion D according to the driving signals from the power supply 8. The cutting portion D, after being driven by the driving source C to cut the web 1 into a desired length, reverts to a waiting position until a subsequent cutting motion is initiated.

The cutting portion D, which is the essence of the present invention, comprises a rotary driving main shaft 13 connected with the output shaft of reduction device 12. A modified isokinetic cam 14 is connected with the main shaft 13 and converts the rotary motion thereof into a horizontal reciprocating motion. A follower 16 follows the modified isokinetic cam curve 15 of the cam 14, and a lower blade die 18 is connected with the follower 16 and slides on a guide shaft 17. A lower cutting blade 19 is fixed to the blade die 18. An upper blade die 21 is slidable on a guide shaft 20 fixed perpendicularly to the blade die 18. An upper cutting blade 22 is fixed to the upper blade die 21 and engages in face-to-face relation with the lower blade 19 to thereby cut the web 1. A gear 23 is provided at the axis of the main shaft 13, a gear 24 meshes at right angles therewith, and a connecting rod 27 causes the upper blade die 21 to travel in a reciprocating perpendicular direction via a crank arm 26 which is rotatably mounted on a shaft 25 of the gear 24. Thus, to briefly summarize the operation according to this apparatus, the blade die 18 is reciprocated horizontally by the cam mechanism 14 while the upper blade die 21 is moved up and down by the crank mechanisms 26 and 27 so that the upper blade 22 engages the lower blade 19 to thereby cut the web 1.

The reason why the modified isokinetic cam curve 15 is employed on the cam 14 is that, by a modified isokinetic motion of the blade die 18, the isokinetic motion area of the upper blade 22 and the lower blade 19 can be designed to be as wide as possible, and at the same time torque variations caused by the operation of the blade die 18 can be as small as possible. The curve is characterized by having a long distance for the isokinetic motion as shown by the velocity(V)/time(T) curve in FIG. 2a. As shown by the torque(Q)/time(T) curve in FIG. 2b, the torque variations are extremely small at the initial driving as well as stopping (the details of which are described in, for example, *KIKAI SEKKEI*, page 68 et seq., published Mar. 1, 1973). The upper blade die 21 is controlled via the gears 23 and 24 such that it moves down at the approximate center of the isokinetic motion of the blade die 18 (the portion shown by the shading in FIG. 2a). The reason for this is because, in addition to improving cutting accuracy by engaging the upper blade 22 with the lower blade 19 in the most stable state, torque variations are prevented upon cutting the web 1 particularly during high speed cutting. The length of web 1 which has traveled toward the cutting portion D is detected by the web length-detecting portion A. If the detected length is identical with the length preselected at the cutting length selector, the control portion B causes the driving source C to rotate the main shaft 13 of the cutting portion D. The angular velocity as well as angular position of the main shaft 13 are fed back successively within the control portion B by the tachometer 9 and the pulse generator 10, respectively. The control portion B controls the rotary drive of the main shaft 13 according to the desired portion of the web 1 to be cut so as to cut it with the upper blade 22 and lower blade 19 jointly, while moving the respective edges of the upper blade 22 and lower blade 19 at the same speed as that of the web 1 in the direction of the arrow F for a limited distance in a horizontal direction.

Thus, rotation is given to the main shaft 13 so that the cam 14 is driven, and then the blade die 18 slides in a horizontal direction along with the guide shaft 17 based upon the modified isokinetic cam curve 15; therefore, the upper blade 22 moves in a horizontal direction, and, at the same time, the upper blade die 21 slides along with the guide shaft 20 in a perpendicular direction via the gears 23, 24, crank arm 26 and connecting rod 27, and absorbs torque variations at the initiation of the slide by flywheel effect of the cam 14. As a result, the upper blade 22 is shifted in a perpendicular direction so that the two blades engage each other at the center of the isokinetic motion area of the lower blade 19, thereby cutting of the web 1. The relative position as well as the depth of travel of the upper blade 22 with respect to lower blade 19 are determined by the fixed positions of the upper blade die 21 and lower blade die 18 as well as the stroke of the connecting rod 27.

As described above, the apparatus in accordance with the present invention provides the following effects.

(1) The horizontal reciprocating velocities of the upper blade 22 and lower blade 19 can be made completely identical with the travelling velocity of the web 1 during the cutting of the web 1, that is, during the time from when the upper blade 22 moves down and the edge thereof penetrates the web 1 to when the upper blade moves upwardly and leaves the web 1.

(2) Upon cutting of the web 1, cutting is not influenced by any torque change accomplished by the driving of the blade die 18. The torque change is zero at the isokinetic motion area of the blade die 18 except for the initial driving and stopping of the blade die 18, and any torque change due to the upper blade die 21 moving downwardly is absorbed by the flywheel effect of the cam 14, and therefore, uneven rotation is not caused by the driving source C.

(3) The cutting of the web 1 is carried out at the approximate center of the isokinetic motion area of the blade die 18 so that it is not influenced by torque changes even at high cutting speeds. For these reasons, it becomes possible to cut a web at a high speed with high accuracy according to the apparatus of the present invention. Actually, accuracies in cutting length can be made less than ±300 microns at 200 cuts per minute.

The above description is based upon one embodiment of the present invention. In the present invention, various modifications are possible without limiting the invention to the above described embodiment. For example, FIG. 3 shows another embodiment of the present invention, in which the up and down reciprocating motion of the upper blade 22 can also be accomplished by driving the upper blade die 21 in a vertical direction via a cam follower 36 and a connecting rod 37 with the rotation of a grooved cam 34 which is provided at one end of the main shaft 13. In such a case, it is possible to further improve the accuracy in cutting length as compared with the case of the first embodiment using the gear mechanism since there is no possibility of causing any mechanical error such as backlash of the gears, and it is further possible to effectively absorb torque changes accomplished by the reciprocating motion of the upper blade die 21 by the increased flywheel effect of the cams 14 and 34. In addition, when the upper blade die 21 is moved up and down based upon the curve, using the modified isokinetic velocity cam curve as previously described and shown in FIGS. 2a and 2b, the amount of torque Q caused can be minimized upon the up and down reciprocating motion of the upper blade die 21 so that stable rotation can be given to the main shaft 13.

Although the modified isokinetic velocity cam curve as shown in FIGS. 2a and 2b is preferred, it is also possible to use a modified sine cam curve for the cam 14. Such a curve has the characteristics illustrated in FIGS. 4a and 4b. FIG. 4a illustrates the velocity(V)/time(T) characteristic, while FIG. 4b illustrates the torque(Q)/time(T) characteristic. It will be observed from FIG. 4b that the torque Q is extremely small peak-to-peak, but to minimize the effect of the torque, the upper blade 22 is brought into engagement with the lower blade 19 at the approximate time of the zero crossing of the torque curve in FIG. 4b.

Furthermore, in the present invention, the web 1 can also be cut by fixing the upper blade 22 and moving the lower blade 19 toward the upper blade 22. In addition, it is not necessarily required to move the web 1 in a horizontal direction. A low speed motor may be directly connected with the main shaft 13 thereby eliminating the need for reduction device 12. An appropriate mark showing a cutting position can be previously marked on the surface of the web 1 and detected by the detecting portion A. In the case where the weights of the cams 14 and 34 are small, a flywheel can also be added independently or a motor having a large angular momentum can also be utilized.

As described above, the apparatus in accordance with the present invention exhibits novel effects as indicated below.

(1) The web 1 is designed to be cut by operating the upper blade 22 and lower blade 19 together, and these blades are driven by the same driving source as that of the cam 14. The blade die 18 is moved at the same speed as that of the web 1 using the modified isokinetic cam 14; therefore, the travelling speed of the web 1 and the edge speeds of the upper blade 22 and lower blade 19 are maintained completely constant so that it becomes possible to maintain the cutting length of the web 1 at a constant length.

(2) The cutting of the web 1 is carried out at the center of the isokinetic motion area of the blade die 18 and at the same time, any torque change due to driving of the blade die 18 is not imparted to the main shaft 13 in such an area so that it becomes possible to cut the web 1 with high accuracy and at a high speed.

(3) It becomes possible to freely set forth, in all cases, the travelling speed of the web 1 by a separate driving means and the cutting length by means of the cutting length selector 5; therefore, it becomes possible to cut the web 1 efficiently at high speed in a variety of sizes.

(4) The driving mechanisms of the lower blade die 18 and the upper blade die 21 are attained with the cam 14 and the cam 34 which are structurally extremely simple; therefore, the whole apparatus is inexpensive to manufacture and easily maintained and inspected.

While the invention has been described in detail and with reference to specific embodiments thereof, it will be apparent to one skilled in the art that various changes and modifications not specifically mentioned can be made therein without departing from the spirit and scope thereof.

What is claimed is:

1. A web cutting apparatus for cutting a continuously traveling web into a desired length, comprising:

a length detecting portion for generating a first signal representative of the length of web fed to said cutting apparatus;

an output rotary shaft for driving said cutting apparatus, the rotational speed of said output rotary shaft controlling the frequency at which said web is cut;

driving means for driving said output rotary shaft;

means for generating a second signal representative of the rotational speed of said output rotary shaft;

means for generating a variable third signal representative of the desired length of web to be cut;

means for receiving and comparing said first, second and third signals and providing a control signal to said driving means to control the rotational speed of said output rotary shaft whereby said web is cut into said desired lengths;

first and second cutting blades in face-to-face relation to one another on either side of said continuously travelling web, one of said blades being movable toward the other and engagable therewith to effect the cutting of said web;

a cylindrical cam mechanism driven by said output rotary shaft and including a modified isokinetic cam surface which causes said first and second cutting blades to simultaneously move in the length direction of said web and parallel to said web by the rotation of said output rotary shaft; and a reciprocating mechanism also driven by said output rotary shaft for moving said one of said blades in a reciprocating manner into and out of engagement with the other of said blades by the rotation of said output rotary shaft, the parallel travelling speeds of said first and second cutting blades being identical with the travelling speed of said web at the approximate center of the parallel travelling motions of said first and second blades where said first and second blades are brought into engagement.

2. The cutting apparatus of claim 1 wherein said reciprocating mechanism comprises a crank arm connected to said output rotary shaft and a connecting rod connected between said crank arm and said one of said blades.

3. The cutting apparatus of claim 1 wherein said reciprocating mechanism comprises a cam connected to said output rotary shaft, a cam follower engaging a cam surface on said cam and a connecting rod connected between said cam follower and said one of said blades.

4. The cutting apparatus of claim 1 wherein said first and second cutting blades are mounted on a common carriage assembly comprising:
 a first guide shaft extending parallel to and in the longitudinal direction of said web,
 a first blade die slidably mounted on said first guide shaft and fixedly securing said other of said cutting blades,
 a cam follower secured to said first blade die and engaging said modified isokinetic cam surface,
 a second guide shaft extending perpendicular to said web and fixedly secured to said first blade die, and
 a second blade die slidably mounted on said second guide shaft and fixedly securing said one of said cutting blades, said second blade die being connected to said reciprocating mechanism.

5. The cutting apparatus of claim 1, further comprising a blade die upon which said first and second cutting blades are mounted, said blade die directly engaging said isokinetic cam surface to be horizontally reciprocated thereby.

* * * * *